(12) United States Patent
Gerszberg et al.

(10) Patent No.: US 6,178,446 B1
(45) Date of Patent: *Jan. 23, 2001

(54) METHOD AND SYSTEM FOR SUPPORTING INTERACTIVE COMMERCIALS DISPLAYED ON A DISPLAY DEVICE USING A TELEPHONE NETWORK

(75) Inventors: Irwin Gerszberg, Kendall Park; Jeffrey S. Martin, Dover, both of NJ (US)

(73) Assignee: AT&T Corp, New York, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/001,578

(22) Filed: Dec. 31, 1997

(51) Int. Cl.[7] ....................................... H04N 7/10
(52) U.S. Cl. ............................. 709/217; 348/12
(58) Field of Search .................... 348/8, 12, 13, 348/2, 10, 6, 7; 455/5.1; 709/217–219; 345/327

(56) References Cited

U.S. PATENT DOCUMENTS

| | | |
|---|---|---|
| 4,456,925 | 6/1984 | Skerlos et al. . |
| 4,620,289 | 10/1986 | Chauvel . |
| 4,725,694 | 2/1988 | Auer et al. . |
| 4,907,079 * | 3/1990 | Turner et al. ............................ 348/2 |
| 4,916,441 | 4/1990 | Gombrich . |
| 5,014,267 | 5/1991 | Tompkins et al. . |
| 5,157,717 | 10/1992 | Hitchcock . |
| 5,249,044 * | 9/1993 | Von Kohorn ......................... 455/4.2 |
| 5,335,276 | 8/1994 | Thompson et al. . |
| 5,393,964 | 2/1995 | Hamilton et al. . |
| 5,406,615 | 4/1995 | Miller, II et al. . |
| 5,488,412 | 1/1996 | Majeti et al. . |
| 5,512,935 | 4/1996 | Majeti et al. . |
| 5,534,913 | 7/1996 | Majeti et al. . |
| 5,546,316 | 8/1996 | Buckley et al. . |
| 5,561,604 | 10/1996 | Buckley et al. . |
| 5,572,005 | 11/1996 | Hamilton et al. . |
| 5,583,965 | 12/1996 | Douma et al. . |
| 5,584,054 | 12/1996 | Tyneski et al. . |
| 5,587,735 | 12/1996 | Ishida et al. . |
| 5,619,684 | 4/1997 | Goodwin et al. . |
| 5,644,628 | 7/1997 | Schwarzer et al. . |
| 5,671,267 | 9/1997 | August et al. . |
| 5,682,195 | 10/1997 | Hendricks et al. . |
| 5,684,918 | 11/1997 | Abecassis . |
| 5,838,314 * | 11/1998 | Neel et al. ............................ 345/327 |
| 5,880,720 * | 3/1999 | Iwafune et al. ...................... 345/327 |

OTHER PUBLICATIONS

US Patent Application 08/943,312 filed Oct. 14, 1997, entitled Wideband Communication System for the Home, to Robert R. Miller, II and Jesse E. Russell, 21 pages.

US Patent Application 08/858, 170 filed May 14, 1997, entitled Wide Band Transmission Through Wire, to Robert R. Miller, II, Jesse E. Russell and Richard R. Shively, 15 pages.

* cited by examiner

Primary Examiner—Nathan Flynn

(57) ABSTRACT

A subscriber to a service will have the ability to order or request additional information on products that are being advertised. The service will have the ability to know which commercial is being aired in which subscriber initiated the request. The subscriber to the service upon viewing a commercial on a display terminal can click on the advertisement to alert the advertiser that the customer is interested in the item that is being advertised. Such interest may include, receiving an information pamphlet, receiving a coupon, and ordering the product directly from the manufacturer or distributor through a requisition request.

29 Claims, 10 Drawing Sheets

METHOD AND SYSTEM FOR SUPPORTING INTERACTIVE COMMERCIALS DISPLAYED ON A DISPLAY DEVICE USING A TELEPHONE NETWORK

TECHNICAL FIELD

This invention relates to interactive commercials, and more particularly, to a communication server which helps provide for interactive commercial service.

BACKGROUND OF THE INVENTION

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services.

One innovative service is for interactive commercials. Interactive commercials are commercials which allow consumers who are watching the commercial to either order the service or merchandise described in the commercial or obtain more information about the product or service. In order for interactive commercials to work, a system is needed which can determine what commercial the consumer is watching and then to match that consumer to that product so as to allow, for example, a manufacturer or retailer to contact the consumer regarding the product or service. It is an object of the present invention to provide such a system to facilitate interactive commercial services.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a video phone and/or other devices to provide new services to an end user; an intelligent services director (ISD) disposed near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

The present invention introduces a novel concept for interactive commercials. A subscriber to the service will have the ability to order or request additional information on products that are being advertised. The service will have the ability to know which commercial is being aired in which subscriber initiated the request.

According to one embodiment of the present invention, a subscriber to the service upon viewing a commercial on a display terminal can click on the advertisement to alert the advertiser that the customer is interested in the item that is being advertised. Such interest may include, receiving an information pamphlet, receiving a coupon, and ordering the product directly from the manufacturer or distributor through a requisition request.

BRIEF DESCRIPTION OF THE DRAWING

The novel features of the invention are set out particularly in the appended claims, but the invention will be understood more fully and clearly from the following detailed description of preferred embodiments of the invention as set forth in the accompanying drawings, in which:

DETAILED DESCRIPTION

Figure 1:
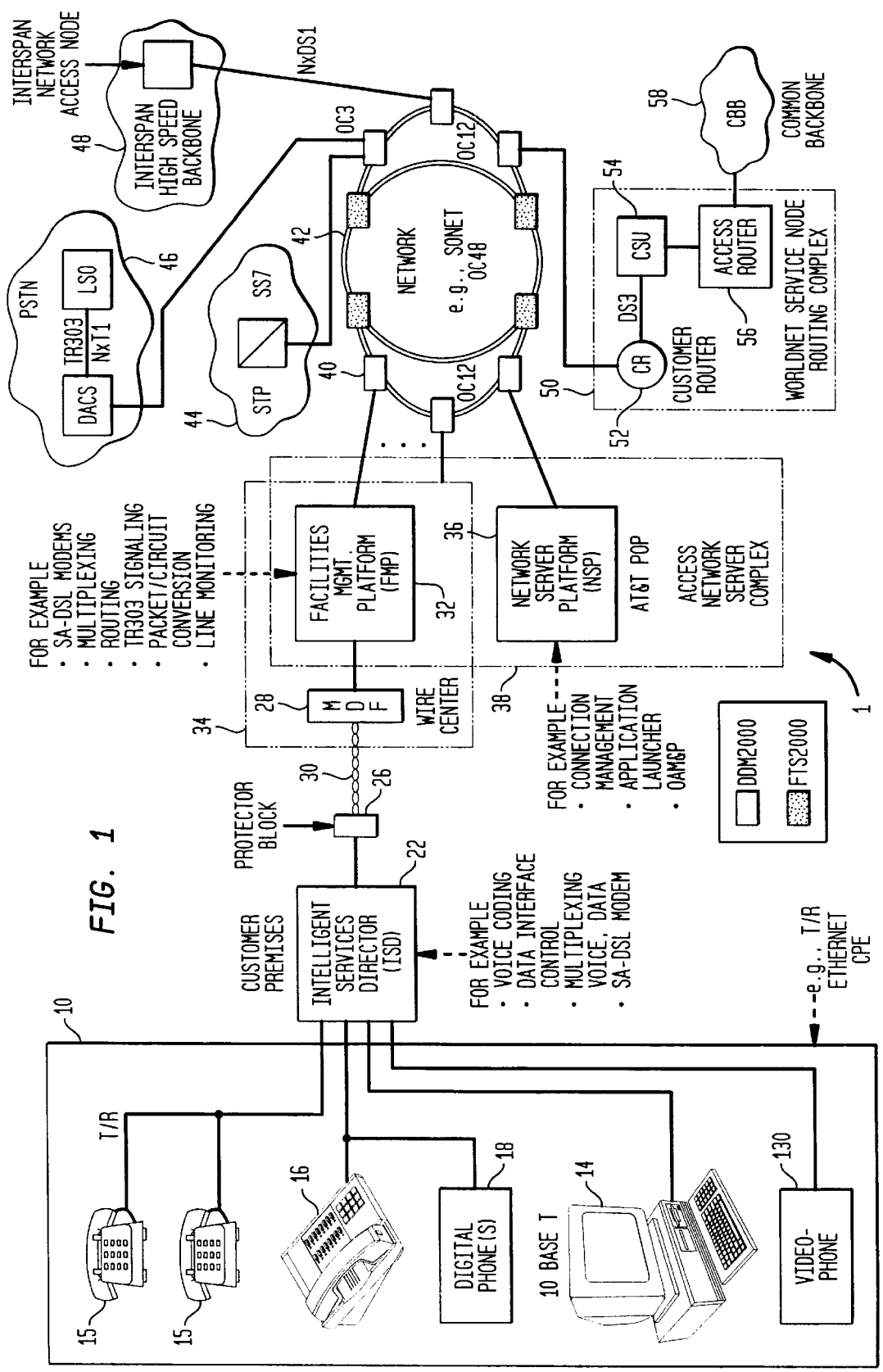
FIG. 1 illustrates an embodiment of a hybrid fiber twisted pair local loop architecture.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply reloading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment.

Figure 2:
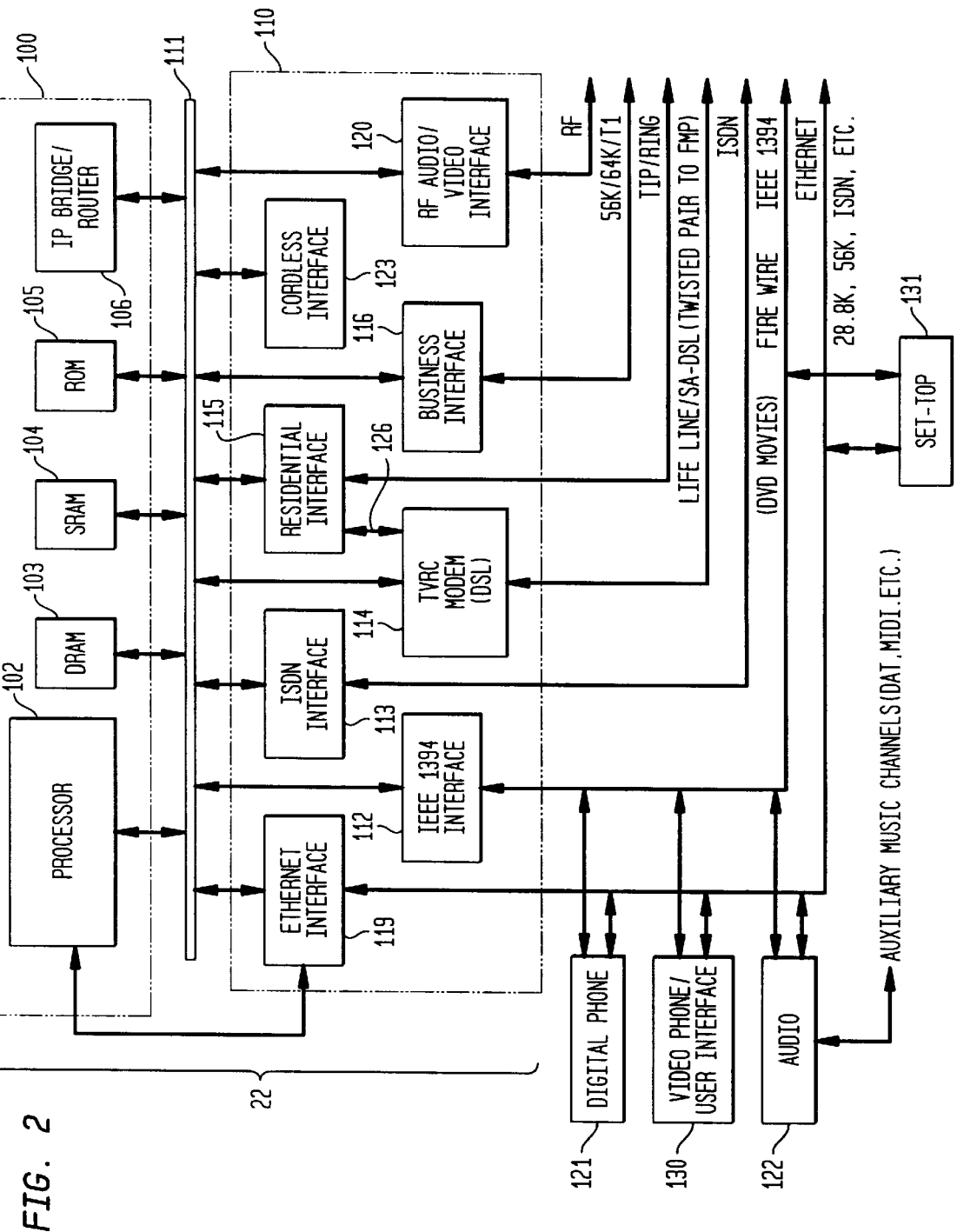
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital videophones 130, devices for monitoring home security, meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 (e.g., for 28.8 kbs data, 56 kbs data, or ISDN), an IEEE 1394 "fire wire" interface 112 (e.g., for a digital videodisc device (DVD)), a TVRC modem interface 114 (e.g., for a digital subscriber line (DSL) modem), a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/ players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a settop device 131.

In further embodiments, the ISD 22 may be configured as an IP proxy server such that each of the devices connected to the server utilizes transmission control protocol/internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/ movie in real time for immediate viewing and/or into storage for later viewing.

Figure 3A:
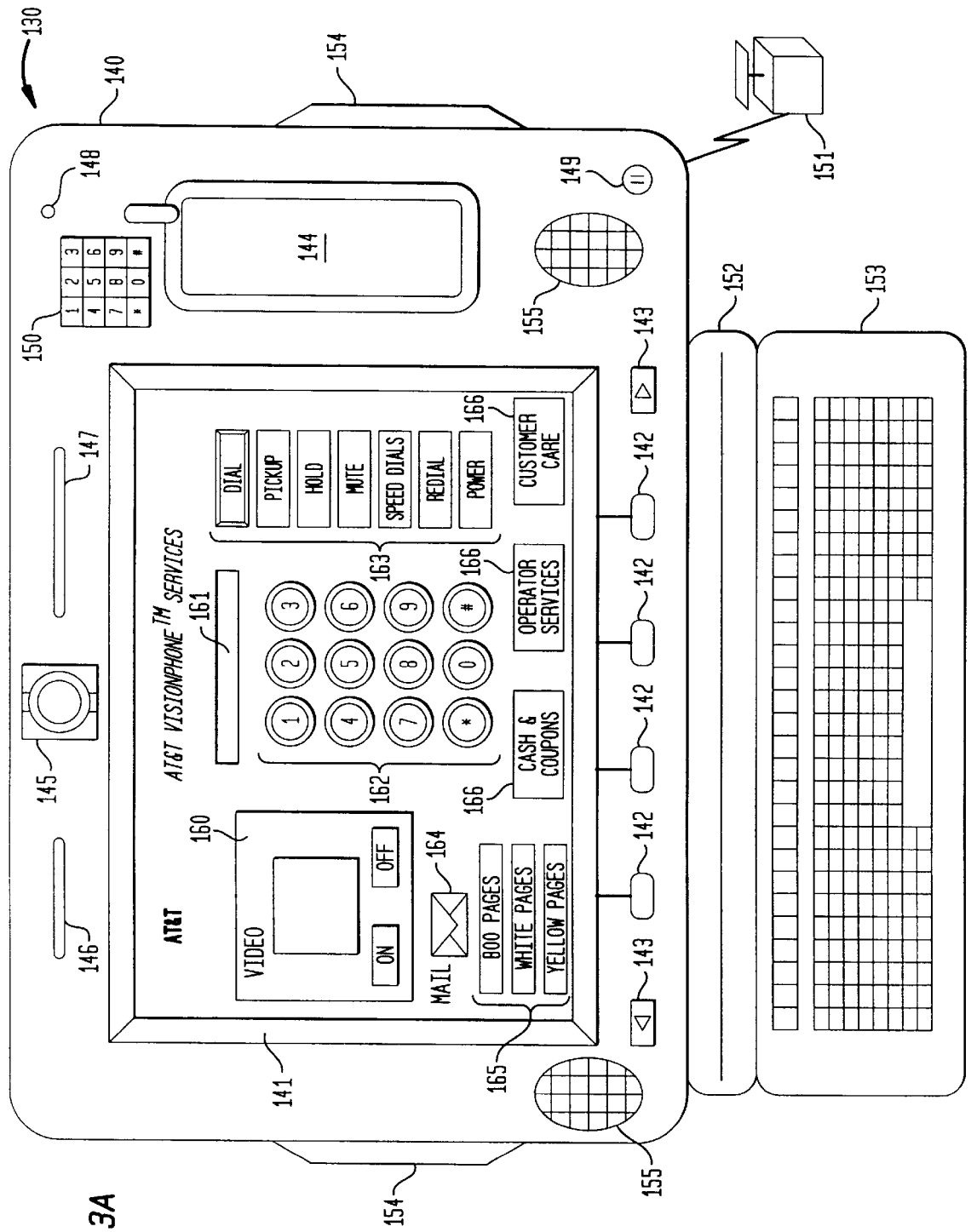
FIGS. 3A and 3B illustrate an embodiment of a video phone consistent with the architecture shown in FIG. 1.
Figure 3B:
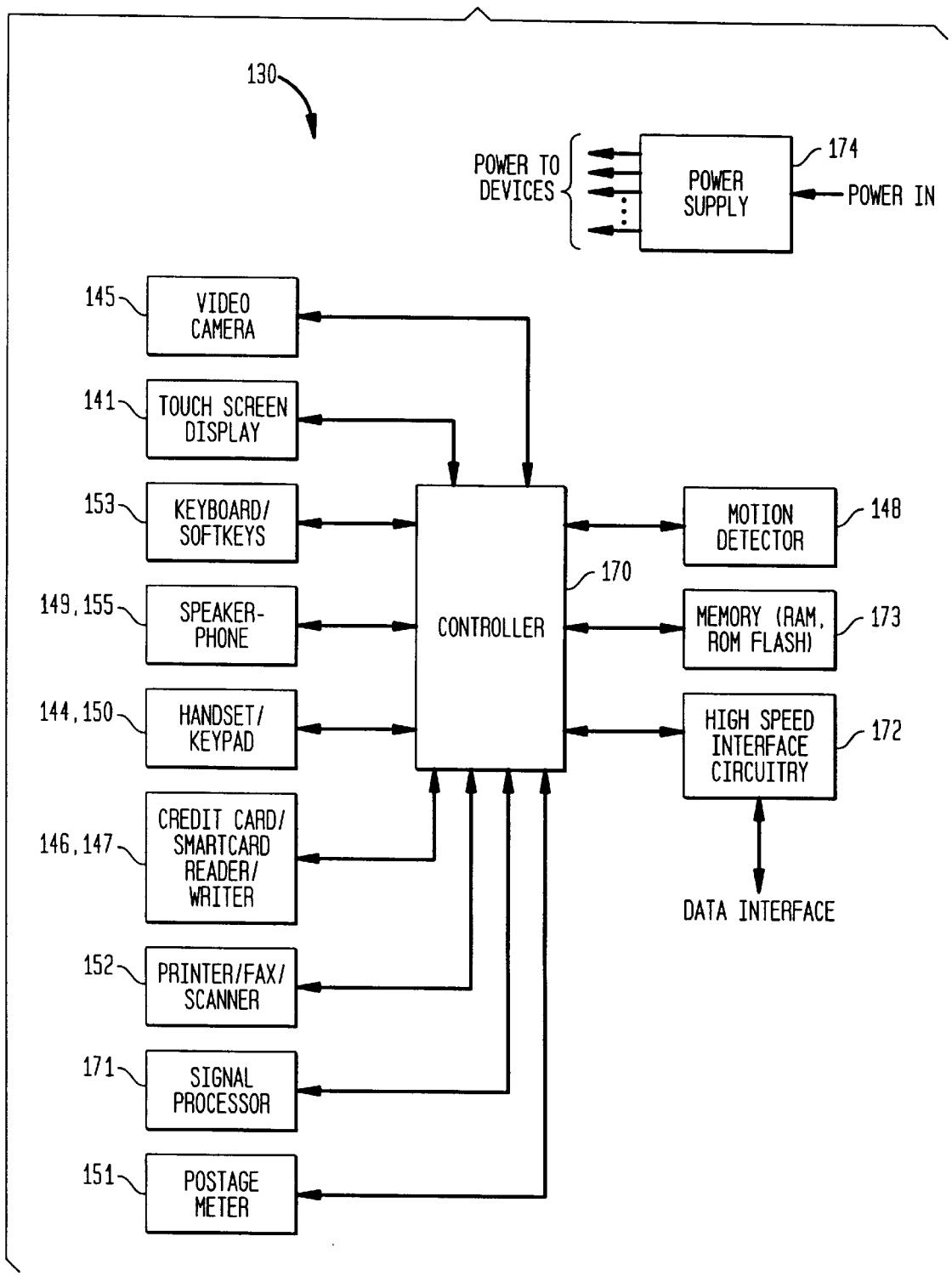

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
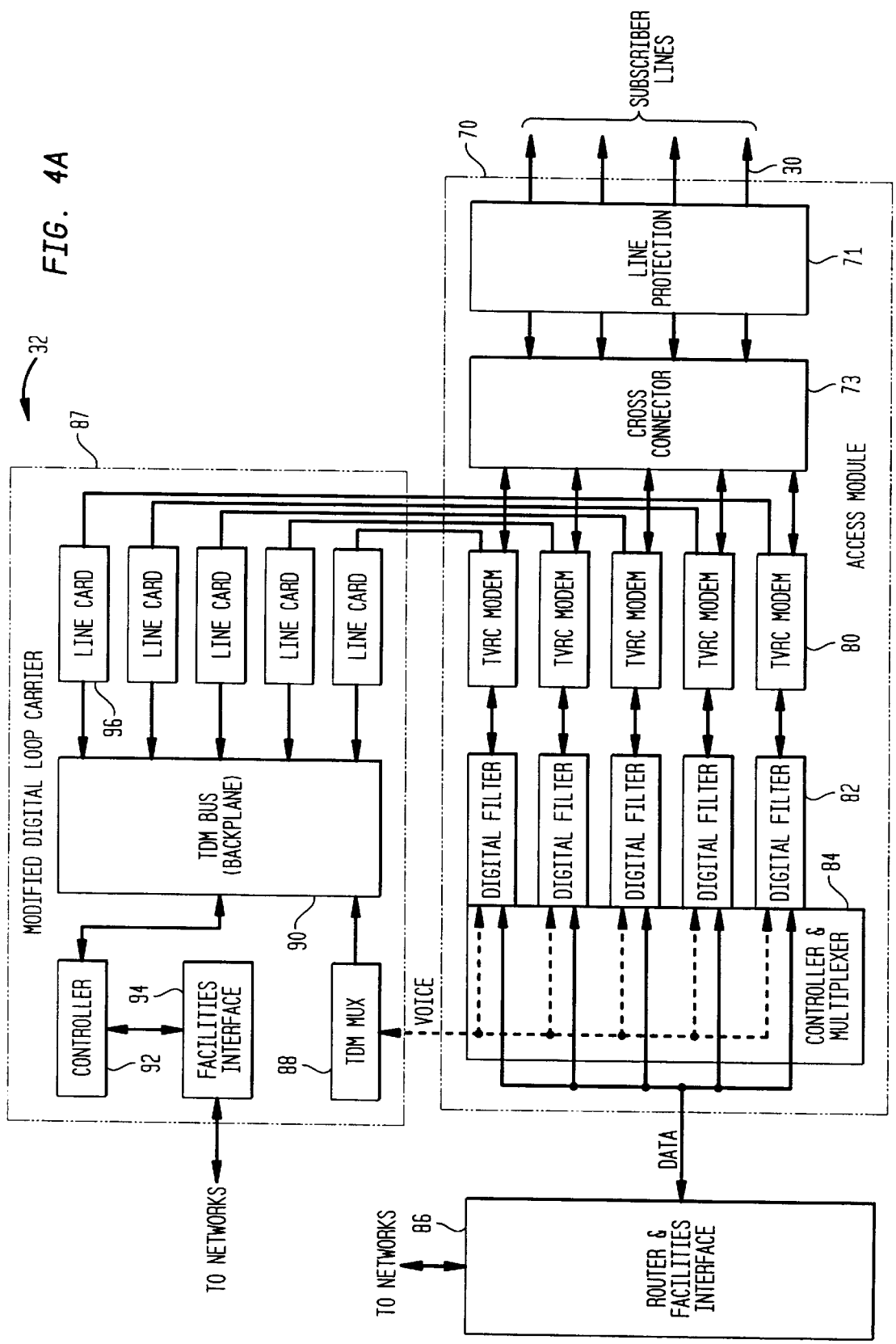
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that are transported across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
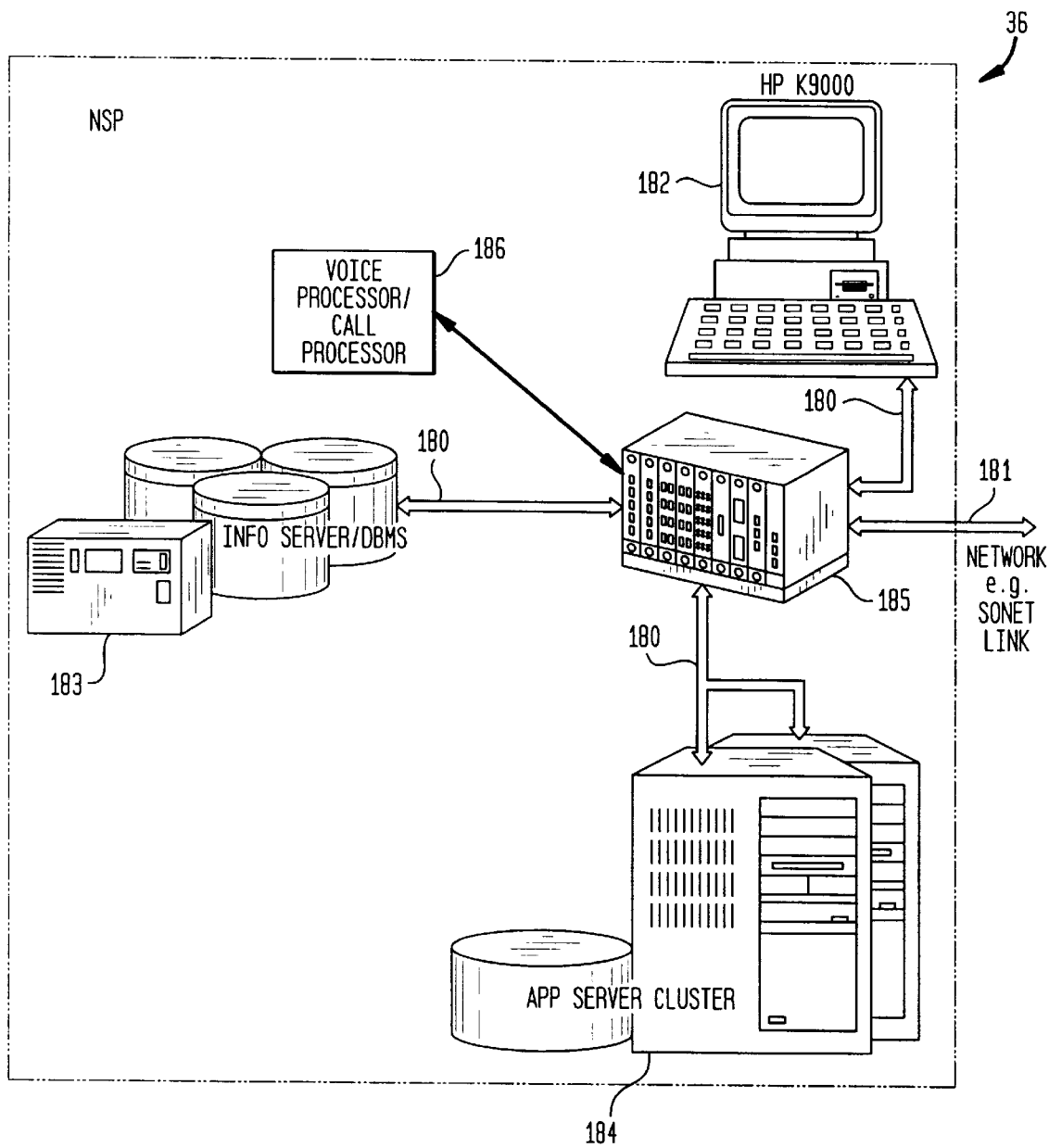
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

Figure 5:
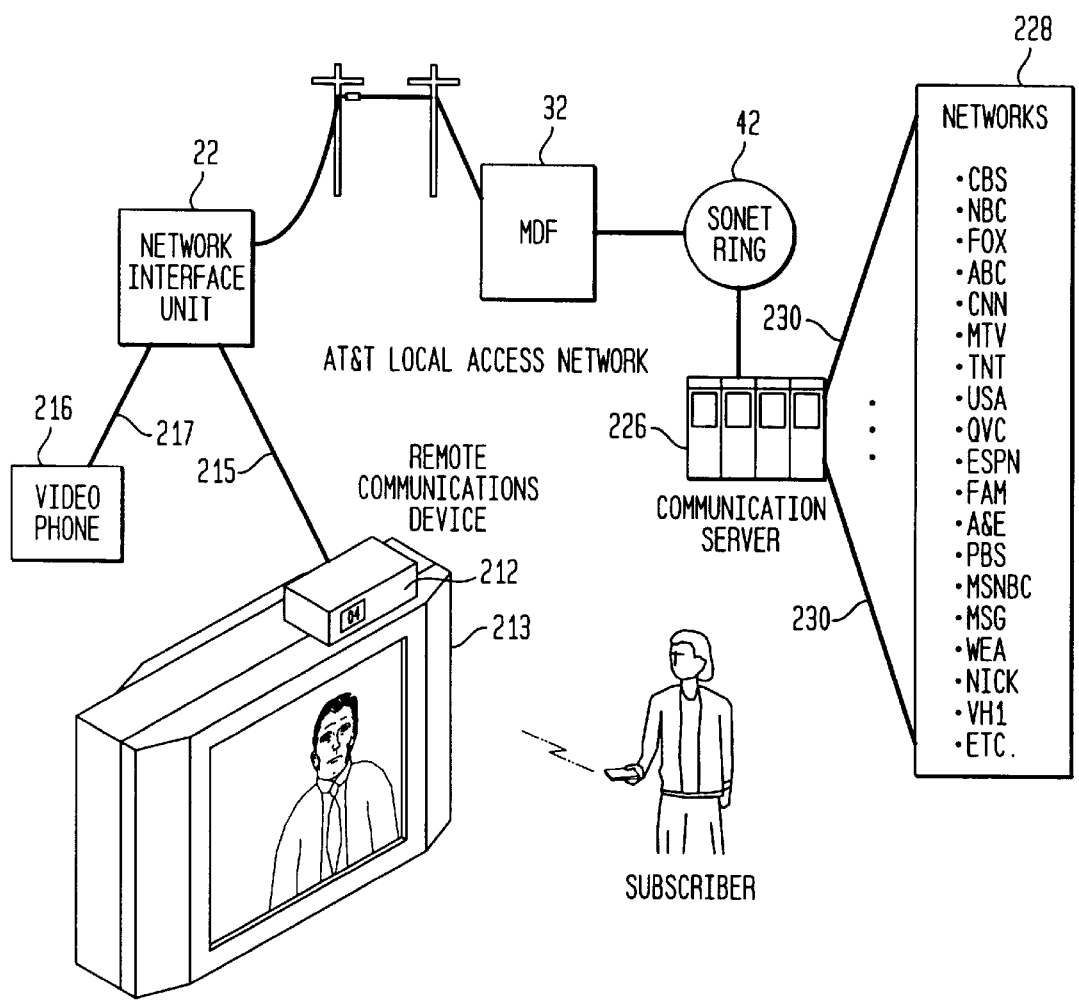
FIG. 5 illustrates a telephone network containing a communication server.

FIG. 5 illustrates a telephone network which is configured to include the inventive communication server 226. According to one embodiment, a subscriber unit 212 is provided as a set top device which is attached to a television 213. The set top device 212 is also connected to a phone line 215 and can also be connected to a cable TV, a direct TV satellite, etc. In another embodiment of the present invention, the subscriber unit can be contained within a video telephone 216. A detailed description of a video telephone can be found in U.S. patent application Ser. No. 09/001,905 entitled "Video telephone" which is being filed concurrently herewith, and is incorporated herein by reference. The subscriber unit for video telephone 216 is connected to the ISD 22 via a telephone line 215 or 217, respectively. As noted above, the ISD 22 is connected to a facilities management platform 32 via a connection 30. The facilities management platform 32 is connected to a sonet ring 42 to which the communication server 226 is connected. The communication server 226 is interconnected to a plurality of television broadcasting networks 228 where the communication server receives information about the advertisements that are being broadcasted on television stations. The connection 230 from the communication server to the television networks can be a low-speed data feed, since only small amounts of data are being transferred.

Figure 6:
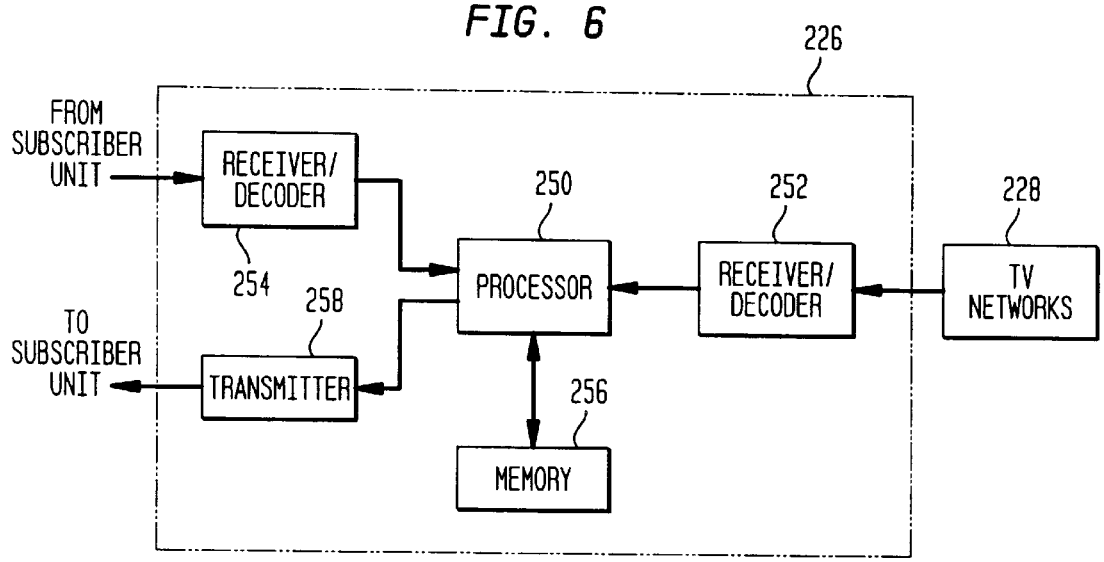
FIG. 6 is a block diagram of the communication server.
Figure 7:
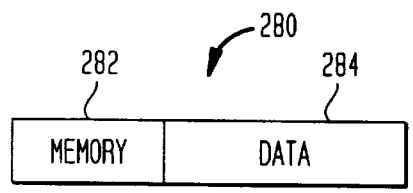
FIG. 7 illustrates the format of a TCP/IP message.

FIG. 6 illustrates a block diagram of the communication server 226. The communication server 226 comprises a communications processor or central processor 250. The central processor 250 receives commercial information from the television networks 228 through a receiver/decoder 252. The processor 250 then stores the received commercial information in a memory 256. The communication server 226 receives information from the subscriber unit via the telephone network through the receiver/decoder 254. The communication server 226 receives requests from the subscriber unit in the form of TCP/IP messages. FIG. 7 illustrates the format of a TCP/IP message, wherein the message 280 divided into two sections, a header section 282 and a data section 284. The message sent by the subscriber unit is decoded by the receiver/decoder 254 to determine the type of request the subscriber has initiated, the identity of the subscriber, the channel that this subscriber is viewing, and the time that the request was initiated. According to one embodiment of the present invention, the identity of the subscriber is extracted from a source field in the header section of the message, while the request type and the channel and time are extracted from the data portion of the message. The communication server 226 also contains a transmitter 258 which is able to transmit information either to the subscriber unit or to a remote server 260. The transmitter 258 is used to transmit messages to the subscriber unit or the remote messages based upon the request received from the subscriber.

The data that is sent from the television networks to the communication server 226 includes, but is not limited to, the identity of the advertisement, the time at which the advertisement was broadcasted, and the channel on which the advertisement was broadcasted.

Figure 8:
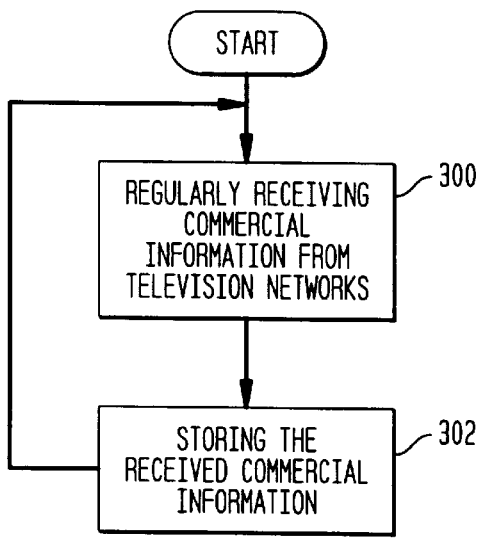
FIG. 8 is a flow chart depicting the interaction between the communication server and the television networks.

The following example will serve to illustrate one embodiment of the present invention. In FIG. 8, the communication server 226 regularly receives commercial information from at least one television network in step 300. The communication server 226 then stores the received commercial information in step 302. This process is regularly repeated so as to keep the commercial information stored in the communication server current. The communication server can also remove information from the storage means after a predetermined period of time.

Figure 9A:
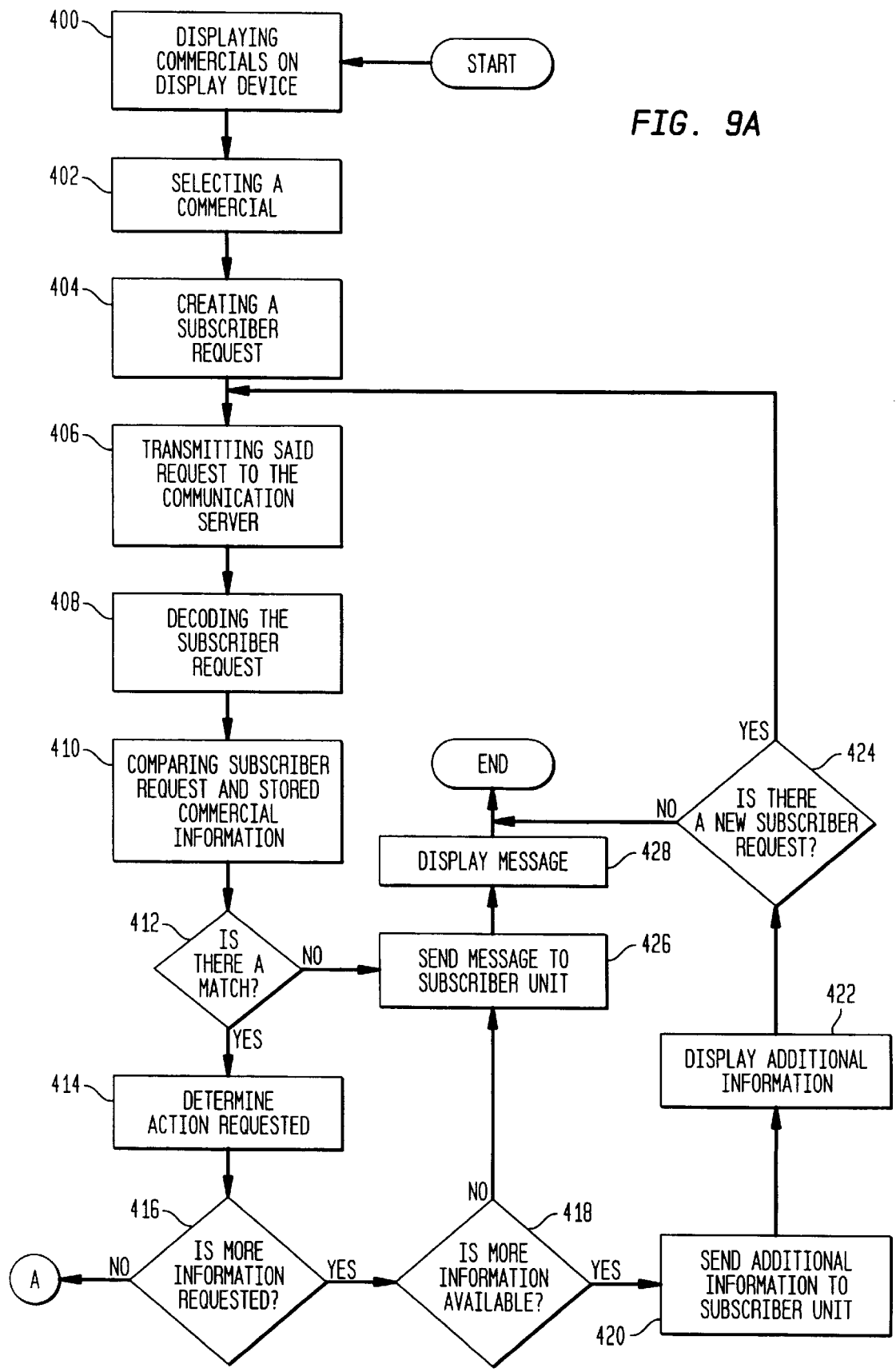
FIGS. 9A and 9B are flow charts illustrating the operations of telephone networks according to one embodiment of the present invention.
Figure 9B:
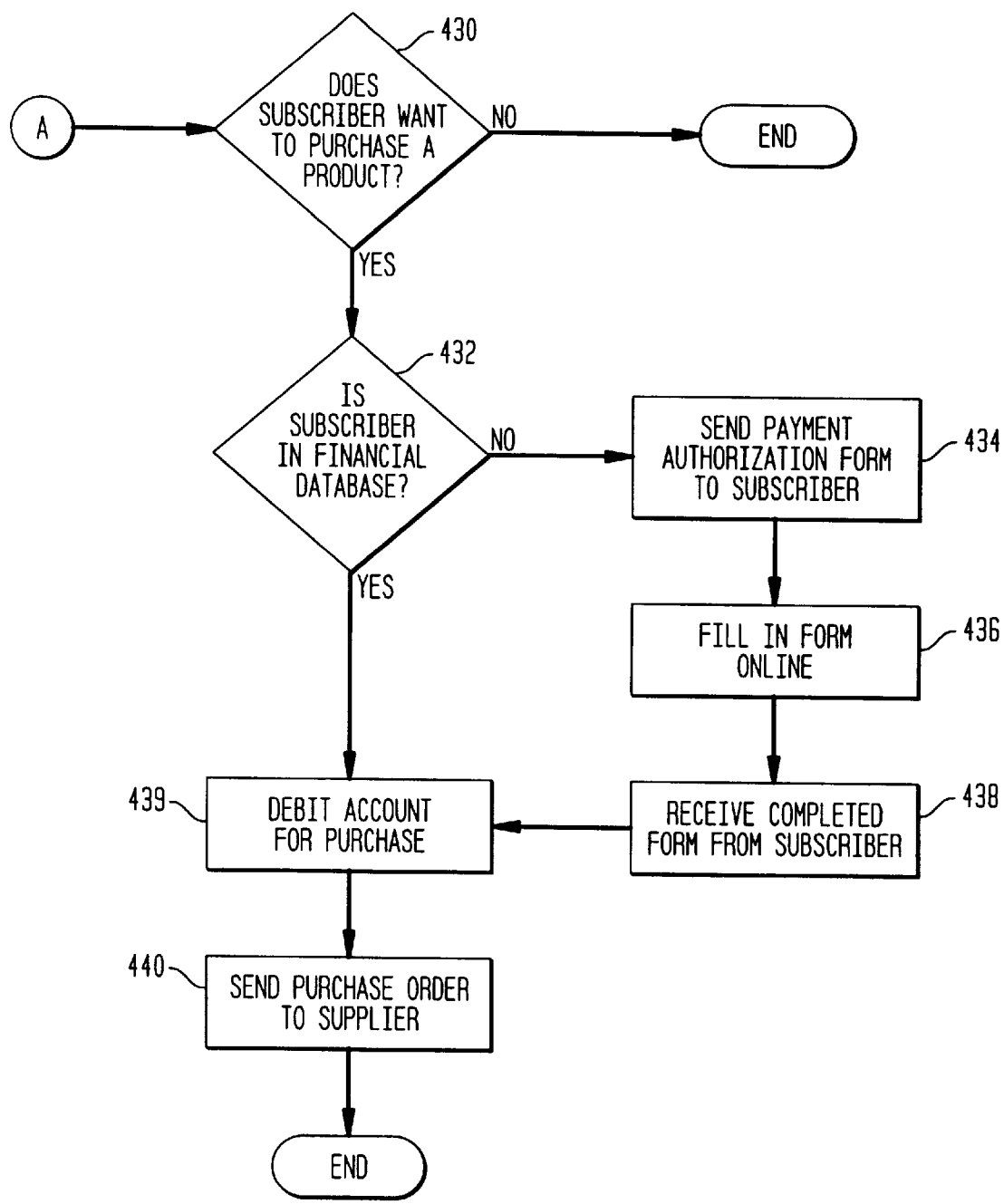

According to the present invention, commercials are regularly displayed on a display device such as a video telephonee or a television which is attached to a set top device. The commercials are sent to the display device over the telephone network and are displayed on the display device in step 400 of FIGS. 9A and 9B. If a subscriber is watching a commercial for yellow widgets on channel 12, for example, and wants to order or receive more information about yellow widgets, the subscriber selects the commercial using an actuation means in step 402. According to one embodiment of the present invention, the actuation means can be a remote control device which sends signals to the set top device so as to create a subscriber request with respect to the commercial being displayed. In another embodiment of the present invention, the actuation means is simply a touch screen on the display device wherein the subscriber only needs to touch on the advertisement itself to create a subscriber request as illustrated in step 404.

Once a subscriber request has been created, the request is transmitted to the communication server 226 through the telephone network in step 406. The communication server 226 then decodes the subscriber request message to determine the subscriber's identity, the channel number that the subscriber was watching, i.e., channel 12 in our example, a time at which the subscriber request was initiated, and a message type indicating an identity of the subscriber request in step 408. Once the message has been decoded, the processor in the communication server 226 then queries the database in its memory to determine the identity of the advertisement that was broadcasted by comparing the channel number and the time at which the advertisement was broadcasted with the channel number and time stored in the database in the memory of the communication server in step 410. It will be understood by one skilled in the art that the database can also be contained in a memory outside of the communication server 226.

If a match is not found in step 412, a message can be sent back to the subscriber in step 426 and a message such as "additional information not available" can be displayed on the display device in step 428. Once a match is found in step 412, the identity of the advertisement can be extracted from the database and stored in a new location along with the subscriber request information.

Once a match is found, the communication server determines the action requested by the subscriber by analyzing the message type information contained in the subscriber request. For example, the subscriber can request more information on the product or the subscriber can indicate the desire to purchase the product. In step 416, it is determined whether the subscriber has requested more information on the product. If it is determined that more information has been requested, the communication server checks the database to see if more information is available in step 418. If more information is not available, a message is sent to the subscriber unit in step 426 and the message is then displayed on the display means in step 428 indicating that no additional information is available. However, if it is determined in step 418 that additional information is available, the additional information is sent to the subscriber unit in step 420 and the additional information is displayed on the display means in step 422. The additional information can also include coupons which can be either printed by a printer attached to the display means or stored on a smart card by swiping the smart card through a smart card slot located on the display means. The system then determines whether there is a new subscriber request in step 424 and if there is a new request, the system returns to step 406.

If it is determined in step 416 that more additional information was not requested, the communication server determines whether the subscriber wishes to purchase a product in step 430. If the subscriber wishes to purchase a product, the communication server then determines whether the subscriber is in a financial database which can contain credit information or bank account information for direct debit processing of the purchase and shipping address information. If it is determined that the subscriber is in the financial database in step 432, the subscriber's account is debited for the purchase in step 439, and a purchase order is sent to the advertiser or a manufacturer or retailer who can fill the order in step 440. If it is determined that the subscriber is not in the financial database, the communication server can send a payment authorization form to the requesting subscriber through the telephone network in step 434. The subscriber can then fill in the form which is displayed on the display means in step 436 and can then send the completed form to the communication server in step 438. The communication server can then send the purchase order to the advertiser or manufacturer or retailer to fill the order.

According to another embodiment of the present invention, individual advertizers can also send video advertisements to the communication server 226. The communication server can then store the video advertisement with an identification code for later broadcast to individual or a plurality of video telephones or set tops. When the communication server sends the video advertisement to the video telephone or set top, the communication server stores the time at which the video advertisement is displayed. The communication server could also store a code which indicates the locations, i.e., the video telephones and/or set tops, where the video advertisement is displayed. If a subscriber request is generated for the video advertisement by the user selecting the advertisement, the subscriber request sent to the communication server 226 can contain the subscriber's identity, a time at which the subscriber request was initiated and a message type indicating an identity (or action requested) of the subscriber request. The communication server 226 can then compare the time at which the subscriber request was initiated with the time of display stored in the memory. If a match is found, then the communication server reacts as described above. It will be understood that advertisements received from the television networks can also be stored for future display by using the above described technique.

The present invention has several advantages. The present invention describes a novel system that can provide revenue to telephone companies who offer interactive advertisement services. The present invention lends itself to a simple implementation without having to extensively modify the infrastructure of the current telephone network. Such revenue could be in the form of a small fee charged for each order placed by a subscriber to the interactive service. Additionally, the new service will help to reduce the costs associated with advertising and marketing products. For example, manufacturers or distributors of a product will no longer require telephone operators to manually take orders from potential buyers. Instead, a list of potential customers can be generated and sent directly to the manufacturer or distributor by the service provider or the service provider could generate an electronic list and dispatch the orders directly to the manufacturer or distributor.

The following applications are being filed concurrently herewith and are incorporated herein by reference:
1. A Hybrid Fiber Twisted-pair Local Loop Network Service Architecture (Gerszberg 41-3-13);
2. Dynamic Bandwidth Allocation for use in the Hybrid Fiber Twisted-pair Local Loop Network Service Architecture (Gerszberg 42-4-14);
3. The VideoPhone (Gerszberg 43-9-2);
4. VideoPhone Privacy Activator (Gerszberg 44-10-3);
5. VideoPhone Form Factor (Gerszberg 45-114);
6. VideoPhone Centrally Controlled User Interface With User Selectable Options (Gerszberg 46-12-5);
7. VideoPhone User Interface Having Multiple Menu Hierarchies (Gerszberg 47-13-6);

8. VideoPhone Blocker (Gerszberg 79-38-26);
9. VideoPhone Inter-com For Extension Phones (Gerszberg 48-14-7);
10. Advertising Screen Saver (53-17);
11. VideoPhone Flexi View Advertising (Gerszberg 49-15-8);
12. VideoPhone Multimedia Announcement Answering Machine (Gerszberg 73-32-20);
13. VideoPhone Multimedia Announcement Message Toolkit (Gerszberg 74-33-21);
14. VideoPhone Multimedia Video Message Reception (Gerszberg 75-34-22);
15. VideoPhone Multimedia Interactive Corporate Menu Answering Machine Announcement (Gerszberg 76-35-23);
16. VideoPhone Multimedia Interactive On-Hold Information Menus (Gerszberg 77-36-24);
17. VideoPhone Advertisement When Calling Video Non-enabled VideoPhone Users (Gerszberg 78-37-25);
18. Motion Detection Advertising (Gerszberg 54-18-10);
19. VideoPhone Electronic Catalogue Service (Gerszberg 50-16-9);
20. A Facilities Management Platform For Hybrid Fiber Twisted-pair Local Loop Network, Service Architecture (Barzegar 18-56-17);
21. Multiple Service Access on Single Twisted-pair (Barzegar (16-51-15);
22. Life Line Support for Multiple Service Access on Single Twisted-pair (Barzegar 17-52-16);
23. A Network Server Platform (NSP) For a Hybrid Fiber Twisted-pair (HFTP) Local Loop Network Service Architecture (Gerszberg 57-4-2-2-4);
24. A Communication Server Apparatus For Interactive Commercial Service (Gerszberg 58-20-11);
25. NSP Multicast, PPV Server (Gerszberg 59-21-12);
26. NSP Internet, JAVA Server and VideoPhone Application Server (Gerszberg 60-5-3-22-18);
27. NSP WAN Interconnectivity Services for Corporate Telecommuters (Gerszberg 71-9-7-4-21-6);
28. NSP Telephone Directory White-Yellow Page Services (Gerszberg 61-6-4-23-19);
29. NSP Integrated Billing System For NSP services and Telephone services (Gerszberg 62-7-5-24-20);
30. Network Server Platform/Facility Management Platform Caching Server (Gerszberg 63-8-63-5);
31. An Integrated Services Director (ISD) For HFTP Local Loop Network Service Architecture (Gerszberg 72-36-22-12);
32. ISD and VideoPhone Customer Premise Network (Gerszberg 64-25-34-13-5);
33. ISD Wireless Network (Gerszberg 65-26-35-14-6);
34. ISD Controlled Set-Top Box (Gerszberg 66-27-15-7);
35. Integrated Remote Control and Phone (Gerszberg 67-28-16-8);
36. Integrated Remote Control and Phone User Interface (Gerszberg 68-29-17-9);
37. Integrated Remote Control and Phone Form Factor (Gerszberg 69-30-18-10);
38. VideoPhone Mail Machine (Attorney Docket No. 3493.73170);
39. Restaurant Ordering Via VideoPhone (Attorney Docket No. 3493.73171);
40. Ticket Ordering Via VideoPhone (Attorney Docket No. 3493.73712);
41. Multi-Channel Parallel/Serial Concatenated Convolutional Codes And Trellis Coded Modulation Encode/Decoder (Gelblum 4-3);
42. Spread Spectrum Bit Allocation Algorithm (Shively 19-2);
43. Digital Channelizer With Arbitrary Output Frequency (Helms 5-3);
44. Method And Apparatus For Allocating Data Via Discrete Multiple Tones (filed Dec. 22, 1997, Attorney Docket No. 3493.20096—Sankaranarayanan 1-1);
45. Method And Apparatus For Reducing Near-End Cross Talk In Discrete Multi-Tone Modulators/Demodulators (filed Dec. 22, 1997, Attorney Docket No. 3493.37219—Helms 4-32-18).

In addition, the following two patent applications are hereby incorporated by reference:

1. U.S. patent application Ser. No. 08/943,312 filed Oct. 14, 1997 entitled "Wideband Communication System for the Home," to Robert R. Miller, II and Jesse E. Russell, and
2. U.S. patent application Ser. No. 08/858,170, filed May 14, 1997, entitled "Wide Band Transmission Through Wire", to Robert R. Miller, II, Jesse E. Russell and and Richard R. Shively.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

What is claimed is:

1. A method for supporting interactive commercials displayed on a display device using a telephone network, comprising the steps of:

sending commercial information from at least one television network to a communication server located in said telephone network;

storing said commercial information in a memory means;

selecting a commercial being displayed on said display screen by pressing an actuation means to generate subscriber request by a subscriber;

transmitting said subscriber request through said telephone network to said communication server;

decoding said subscriber request;

comparing said decoded subscriber request with said stored commercial information;

storing said subscriber request and information regarding a particular commercial if a match is found;

determining what type of action is being requested by the subscriber from the decoded subscriber request;

if a subscriber has requested more information regarding the subject matter of the commercial, checking a database to determine if additional information is available, to said communication server;

sending said subscriber unit additional information for display on said display means if additional information is available to said communication server; and sending said subscriber request to appropriate advertiser if additional information is not available to said communication server.

2. The method according to claim 1, further comprising the steps of:

sending a message from said communication server to said subscriber if a match is not found; and displaying said message on said display screen.

3. The method according to claim 1, wherein said commercial information comprises:

an identity of said commercial;

a time at which said commercial was broadcasted; and a channel number for which said commercial was broadcasted on.

4. The method according to claim 1, wherein said subscriber request comprises:

a subscriber identity;

channel number;

a time at which said subscriber request was initiated;

a message type indicating an identity of said subscriber request.

5. The method according to claim 1, wherein said at least one television network frequently sends updated commercial information to said communication server.

6. The method according to claim 1, further comprising the steps of:

if a subscriber has requested to purchase the subject matter of the commercial, communication server checks a database to determine how the subscriber wants to pay, wherein said database comprises credit card or bank account information for direct debit and shipping address information;

sending a purchase order to appropriate advertiser.

7. The method according to claim 1, further comprising the steps of:

if a subscriber has requested to purchase the subject matter of the commercial, sending a payment authorization form to said subscriber unit for display on said display screen, wherein the subscriber fills in the appropriate information on-line;

sending completed payment authorization form to said communication server; and sending purchase order to appropriate advertiser.

8. The method according to claim 1, further comprising the step of:

if a subscriber has requested to purchase subject matter of the commercial, generating a paper payment authorization form which is mailed to said subscriber.

9. The method according to claim 1, wherein said actuation means is at least one button on a control means which communicates with a subscriber unit which is associated with said display screen.

10. The method according to claim 9, wherein said control means is a remote control device.

11. The method according to claim 1, wherein said display screen is a video telephone.

12. The method according to claim 1, wherein said actuation means is a touch screen of the display screen.

13. The method according to claim 1, further comprising the steps of:

sending said subscriber an electronic coupon if said subscriber has requested a coupon and a coupon is available.

14. A system for supporting interactive commercials using a telephone network, comprising:

a communication server located in said telephone network for receiving commercial information from at least one television network;

memory means for storing said commercial information sent to said communication server;

display means for displaying interactive commercials;

a subscriber unit connected to said display means which has an associated control means which allows a subscriber to create a subscriber request for a commercial being displayed by pressing an actuation means on said control means, wherein said subscriber unit transmits said subscriber request to said communication server through said telephone network;

wherein said communication server decodes said subscriber request and compares the decoded subscriber request with said stored commercial information and stores the subscriber request and information regarding a particular commercial if a match is found;

wherein said communication server determines what type of action is being requested by the subscriber from the decoded subscriber request and if a subscriber has requested more information regarding the subject matter of the commercial, checking a database to determine if additional information is available, to said communication server;

means for sending said subscriber unit additional information for display on said display means if additional information is available to said communication server;

means for sending said subscriber request to appropriate advertiser if additional information is not available to said communication server.

15. The system according to claim 14, wherein said commercial information comprises:

an identity of said commercial;

a time at which said commercial was broadcasted; and a channel number for which said commercial was broadcasted on.

16. The system according to claim 14, wherein said subscriber request comprises:

a subscriber identity;

a channel number;

a time at which said subscriber request was initiated;

a message type indicating an identity of said subscriber request.

17. The system according to claim 14, further comprising:

database means with additional information regarding products or services shown in said commercials, wherein said communication server copies the additional information from said database means and sends the additional information to said subscriber unit for display on said display means.

18. The system according to claim 14, further comprising:

database means which comprises credit card or bank account information for direct debit and shipping address information, wherein said communication server can access said database means if it is determined that the subscriber wants to buy the product or service shown in said commercial.

19. The system according to claim 14, wherein if a subscriber has requested to purchase the product or service shown in the commercial, the communication server sends a payment authorization form to said subscriber unit for display on said display means, wherein the subscriber fills in the appropriate information on-line and sends the completed payment authorization form to the communication server which sends a purchase order to appropriate advertiser.

20. The system according to claim 14, wherein if a subscriber has requested to purchase the product or service shown in the commercial, the communication server generates a paper payment authorization form which is mailed to said subscriber.

21. The system according to claim 14, wherein said display means is a television.

22. The system according to claim 14, wherein said display means is a video telephone.

23. The system according to claim 14, wherein said control means is a remote control.

24. The system according to claim 14, wherein said control means is built into said subscriber unit.

25. The system according to claim 22, wherein said subscriber unit and said control means are built into said video telephone.

26. The system according to claim 23, wherein said actuation means in as least one predetermined button on said remote control.

27. The system according to claim 25, wherein said actuation means is a touch screen on said video telephone.

28. The system according to claim 14, wherein said commercial information comprises:
    an identity of said commercial; and
    a time at which said commercial was broadcasted.

29. The system according to claim 14, wherein said subscriber request comprises:
    a subscriber identity;
    a time at which said subscriber request was initiated; and
    a message type indicating an identity of said subscriber request.

* * * * *